(12) United States Patent
Demant et al.

(10) Patent No.: US 7,665,083 B2
(45) Date of Patent: Feb. 16, 2010

(54) METHOD AND APPARATUS FOR SUPPORTING CONTEXT LINKS FOR APPLICATION PROGRAM TEXT

(75) Inventors: Hilmar Demant, Karlsdorf (DE); Joachim Gaffga, Wiesloch (DE)

(73) Assignee: SAP AG, Walldorf (DE)

( * ) Notice: Subject to any disclaimer, the term of this patent is extended or adjusted under 35 U.S.C. 154(b) by 1013 days.

(21) Appl. No.: 11/111,931

(22) Filed: Apr. 22, 2005

(65) Prior Publication Data

US 2006/0015859 A1 Jan. 19, 2006

Related U.S. Application Data

(63) Continuation-in-part of application No. 10/896,971, filed on Jul. 23, 2004, now abandoned.

(60) Provisional application No. 60/588,397, filed on Jul. 16, 2004.

(51) Int. Cl.
*G06F 9/44* (2006.01)
(52) U.S. Cl. .................. 717/173; 717/100; 717/102; 717/120; 717/178; 707/3; 707/6
(58) Field of Classification Search ................ 717/172, 717/173, 177, 178, 100–102, 120; 707/3, 707/6
See application file for complete search history.

(56) References Cited

U.S. PATENT DOCUMENTS 5,815,830 A * 9/1998 Anthony .................. 707/6
6,311,177 B1 * 10/2001 Dauerer et al. .............. 707/2

(Continued)

OTHER PUBLICATIONS

Root, et al., "Microsoft Web Services Enables Office: A New Developer Framework Links Word, Excel, and Outlook to Back-End Apps, *Quick Take*," Forrester Research, Inc., May 24, 2004, pp. 1-5.

(Continued)

*Primary Examiner*—Wei Y Zhen
*Assistant Examiner*—Matthew J Brophy
(74) *Attorney, Agent, or Firm*—Kenyon & Kenyon LLP

(57) ABSTRACT

Methods and apparatus are provided for supporting text-based context links for application programs. In some embodiments, an application executing on a first computer system may receive a request to open a context link to a text element in a document. The application may determine, based on a list of context links, whether more than one data object is associated with the text element. If so, a list of data objects associated with the text element and distinguishing information may be displayed, a selection of a data object from the displayed list may be received, and a selection of an action relating to a context link for the selected data object may be received. In some embodiments, the context link list is created by parsing a document into text elements at the first computer, storing entries representing a plurality of text elements on a list, and transmitting the list to a second computer to determine in the second computer if the text elements are associated with data objects. In some embodiments, before transmitting a data element to a second computer to determine an association with a data object, a software cache is checked to determine if the text element has already been transmitted, with text elements removed from the software cache if the software cache is larger than a threshold amount.

18 Claims, 12 Drawing Sheets

U.S. PATENT DOCUMENTS

| | | | |
|---|---|---|---|
| 6,915,307 B1 * | 7/2005 | Mattis et al. | 707/103 R |
| 7,003,522 B1 * | 2/2006 | Reynar et al. | 707/10 |
| 2005/0182773 A1 * | 8/2005 | Feinsmith | 707/100 |

OTHER PUBLICATIONS

Microsoft Office Information Bridge Framework, IW New Markets, "Information Bridge Framework: Technical Overview," Jun. 22, 2004, pp. 1-129.

Microsoft Office Developer Center, "Smart Tags and Smart Documents," http://msdn.microsoft.com/office, *Microsoft Corporation*, 2004, pp. 1-2.

Microsoft Office Assistance: "About Smart Tags," http://office.microsoft.com/assistance, *Microsoft Corporation*, 2004, p. 1.

Microsoft Office Assistance: "Use Smart Tags," http://office.microsoft.com/assistance, *Microsoft Corporation*, 2004, p. 1.

Microsoft Office Developer Center, "Smart Tags and Smart Documents," http://msdn.microsoft.com/office *Microsoft Corporation*, 2005, pp. 1-2.

"Microsoft Office Information Bridge Framework," *Microsoft Corporation*, 2004, pp. 1-2.

Cornell, "Smart Documents Development Overview," *Microsoft Corporation*, Apr. 2003, pp. 1-28.

Kelly, Overview of Smart Client Applications in the Microsoft Office System, *Microsoft Corporation*, Oct. 2003, pp. 1-7.

Rice, et al., "Adding an ActiveX Control to a Smart Document," *Microsoft Corporation*, Dec. 2003, pp. 1-13.

Rice, Simple Sample of a Smart Document in Microsoft Office Word 2003, *Microsoft Corporation*, Jan. 2004, pp. 1-13.

Microsoft Office 2003 Smart Tag Software Development Kit, "Smart Tag SDK," http://msdn.microsoft.com/library, *Microsoft Corporation*, 2005, pp. 1-2.

Microsoft Office 2003 Smart Document Software Development Kit, "Microsoft Office 2003 Smart Document," http://msdn.microsoft.com/library, *Microsoft Corporation*, 2005, pp. 1-2.

Office 2003 Smart Document Software Development Kit, "Smart Documents Overview," http://msdn.microsoft.com/library, *Microsoft Corporation*, 2003, pp. 1-2.

Office 2003 Smart Documents Software Development Kit, "Introduction to Developing Smart Documents," http://msdn.microsoft.com/library, *Microsoft Corporation*, 2003, pp. 1-2.

Office 2003 Smart Document Software Development Kit, Introduction to Deploying Smart Documents, http://msdn.microsoft.com/library, *Microsoft Corporation*, 2005, pp. 1-2.

Office 2003 Smart Document Software Development Kit, "Introduction to the Tutorials," http://msdn.microsoft.com/library, *Microsoft Corporation*, 2005, pp. 1-2.

"Smart Documents: A Smarter Way to Do Business," http://microsoft.com/office/editions, *Microsoft Corporation*, Aug. 15, 2003, pp. 1-3.

* cited by examiner

METHOD AND APPARATUS FOR SUPPORTING CONTEXT LINKS FOR APPLICATION PROGRAM TEXT

CROSS-REFERENCE TO RELATED APPLICATIONS

This application claims the benefit of priority as a continuation-in-part application of U.S. application Ser. No. 10/896,971, filed Jul. 23, 2004, now abandoned which claims the benefit of priority afforded by U.S. provisional application Ser. No. 60/588,397, filed Jul. 16, 2004.

BACKGROUND OF THE INVENTION

An application program may be used to perform operations on a document that contains textual elements that relate to data objects, such as such as for example an order, business partner, quotation, or invoice. A textual element is a string of characters that is typically deliminated by a separator, such as a space or the end of a field. Some examples of text elements are a word, a number, or a phrase. A data object is an item of data that is associated with one or more functions (i.e., operations) that may be performed with that data. One type of data object is a "business object," which would concern a commercial matter. In the case of the data object "order," for example, a user may be able to command a computer system to perform functions with the order such as creating a new order, checking the order status, canceling the order, shipping a product that was ordered, displaying information for an order, displaying a list of data objects that are related to the order, etc.

An application program may include "context links" that associate such text elements within a document with functions related to those text elements so that a user may access the functions by selecting the text elements. For example, a word processor may be used to process a document that contains a plurality of words, and one or more individual words may by highlighted to indicate that there is a context link for these words. If in this example one of the words is a person's name that is highlighted to indicate the presence of a context link for that name (e.g., because that person is an employee), by clicking on this name a user may cause the display of accessible functions that are associated with that person, such the ability to invoke an email program to create an email message that is addressed to the person.

DETAILED DESCRIPTION

Embodiments of the present invention provide methods and apparatus for supporting text-based context links for application programs. According to embodiments, data objects and functionality in a back-end system may be used to efficiently create context links in a front-end system, thus providing an alternative entry point into the back-system out of the front-end system's applications. These context links may be used to access the related data objects by, for example, displaying information related to the data object or performing functions on the data object. Thus, free unstructured text in a front-end system application may be checked for known business related contexts. Tokens or phrases in this text may enriched with certain meta-data to allow specified actions to be performed, so as to navigate into applications in the back-end system from within the front-end system application.

Some embodiments of the present invention provide a user who is processing a document in a front-end system application with access to multiple data objects of the same type that match a single text element in the front-end system document. In addition, some embodiments of the present invention provide for optimization of the matching of front-end system tokens with backend system content by the front-end system passing a list of token's (instead of as individual tokens) to a backend system bulk recognition function. In this way, some embodiments of the present invention reduce network traffic. Further, some embodiments of the present invention provide for the optimization of a software "cache" in the front-end system that is used to store tokens corresponding to text elements found in a front-end system document. It may be understood that the examples discussed below are for illustration purposes only and are not intended to limit the configuration to that shown.

Figure 1:
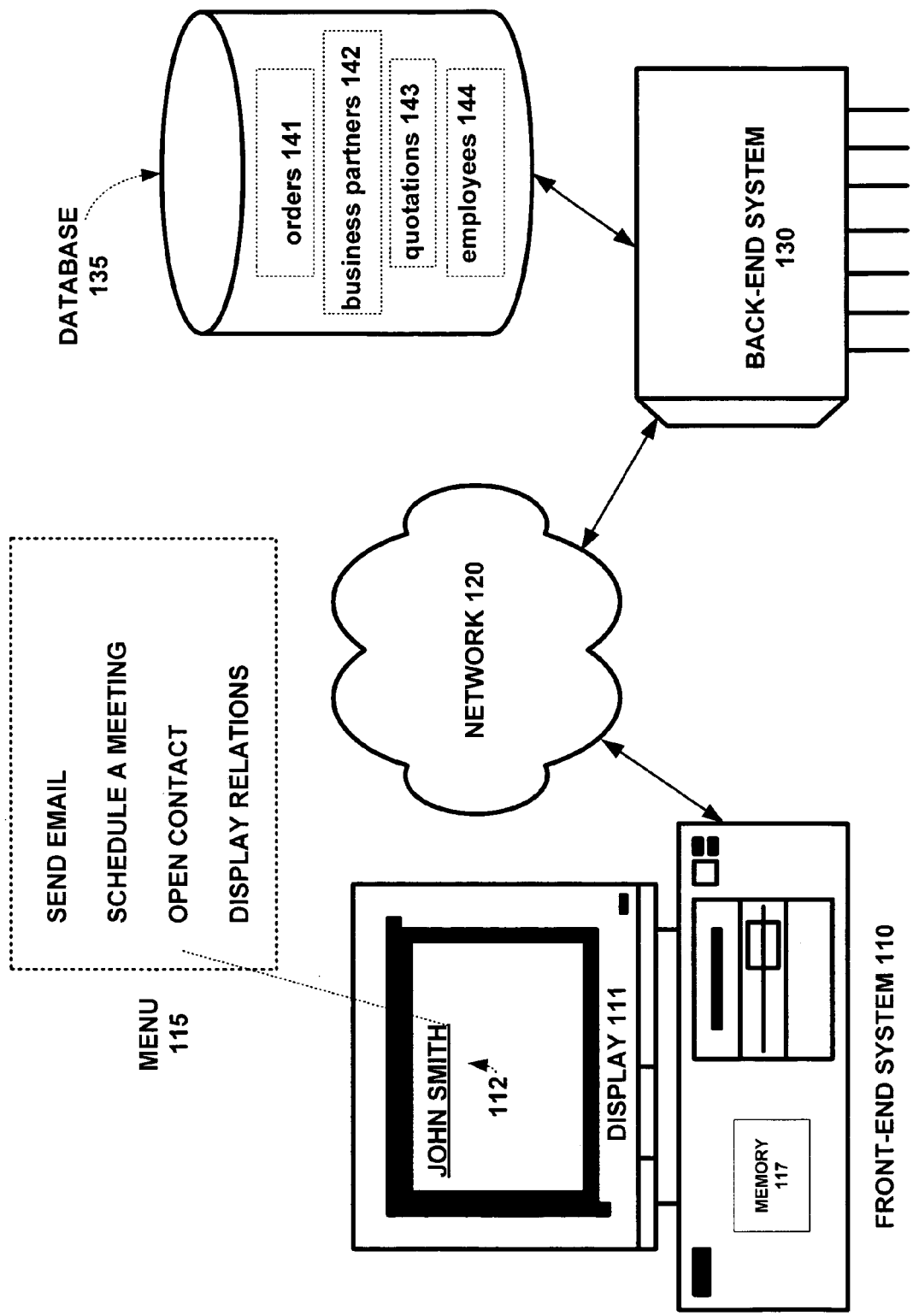
FIG. 1 is a simplified block diagram that illustrates a front-end computer system that supports access from text element context links in the front-end computer system to data objects in a back-end computer system according to an embodiment of the present invention.

FIG. 1 is a simplified block diagram that illustrates a front-end computer system that supports access from text element context links in a front-end computer system to data objects in a back-end computer system. FIG. 1 shows a front-end system 110, a network 120, a back-end system 130 and a database 135. Front-end system 110 may be any type of device for running application software, such as for example a personal computer, a terminal, a personal digital assistant (PDA), etc. Network 120 may be any type of network for communicating information, such as a local area network (LAN), wide area network (WAN), the Internet, or an intranet. Back-end system 130 may be a terminal server, mainframe computer, or any type of computer system that services users over network 120. Typically, many front-end systems may be coupled to back-end system 130 through network 120. As shown, back-end system 130 is coupled to database 135, which may be any type of computer readable medium, such as one or more hard disk memories that stores instructions and data for an enterprise resource planning system that maintains a collection of data to support a decision making process. Database 135 may contain a plurality of data object types, which are shown for example as orders 141, business partners 142, quotations 143, and employees 144, that are maintained by back-end system 130 in that back-end system 130 may perform functions on these data objects.

As shown in FIG. 1, front-end system 110 is displaying the text "John Smith", which may be text in a file that is currently being operated on by an application program such as a word processor. Front-end system 110 also contains a memory 117, which may be for example a Random Access Memory (RAM). In FIG. 1, the text "John Smith" being operated on by front-end system 110 is shown as linked to a menu 115, which contains the actions "SEND EMAIL", "SCHEDULE A MEETING", "OPEN CONTACT", and "DISPLAY RELATIONS".

Figure 2:
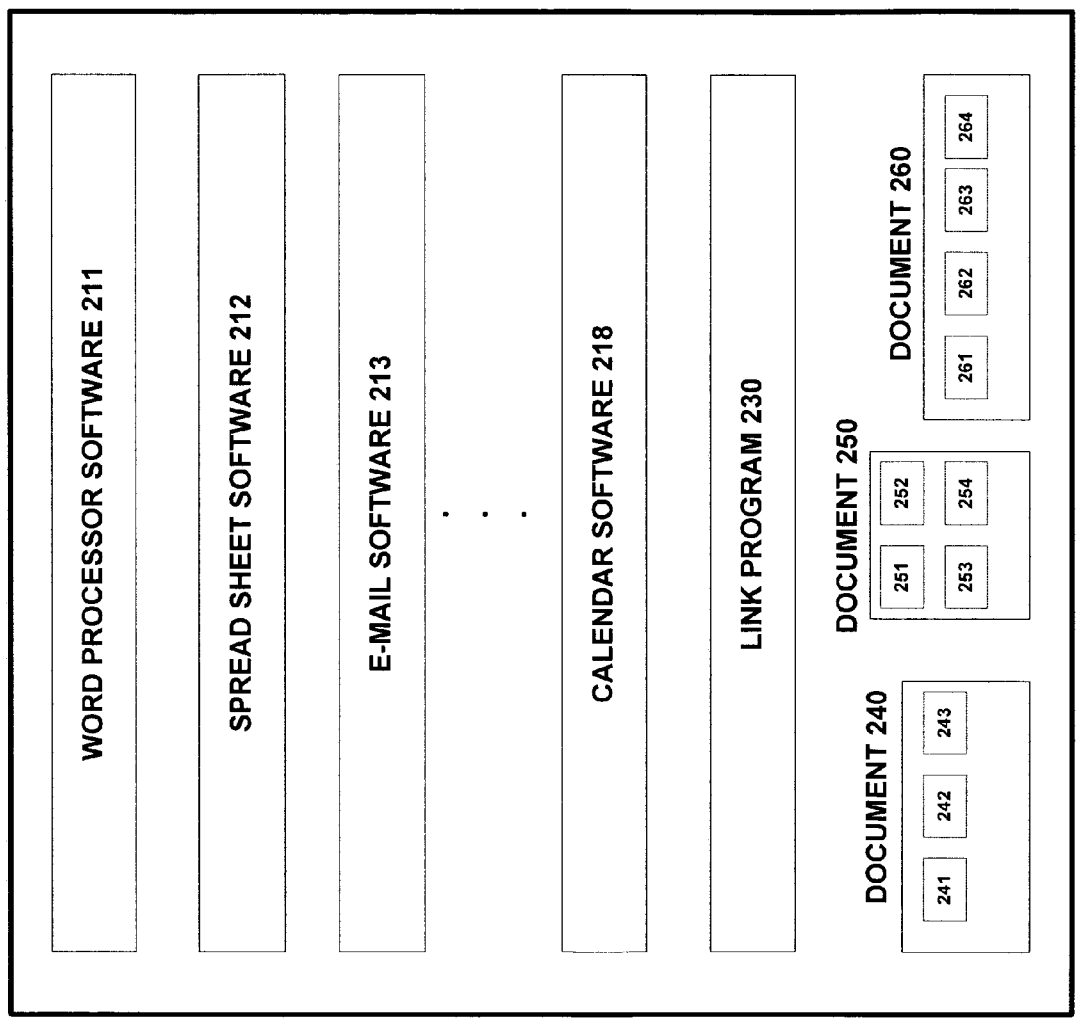
FIG. 2 is a simplified block diagram that illustrates programs stored in a memory of a front-end computer system for supporting context links according to an embodiment of the present invention.

FIG. 2 is a simplified block diagram that illustrates programs stored in a memory of a front-end computer system for supporting context links according to an embodiment of the present invention. FIG. 2 shows programs stored in memory 117. Memory 117 may store a plurality of application programs 211-218 that may be running on front-end system 110. As shown in FIG. 2, memory 117 stores a word processor software 211, spread sheet software 212, email software 213, and calendar software 218, but of course memory 117 may store any other programs that may be running on front-end system 110. As shown in FIG. 2, memory 117 also stores a plurality of documents 240-260, each of which may be documents that are operated on by application programs 211-218. Each of the documents are shown as including a plurality of text elements 241-243, 251-254, and 261-264, which may be words or phrases in documents 240 to 260. Memory 117 is also shown as storing a link program 230 which may be executed by the front-end system to support context links between text elements in front-end system 110 and data objects in back-end system 130 according to an embodiment of the present invention.

In an embodiment, and as shown in FIG. 1, front-end system 110 may be adapted to execute one or more application programs (such as programs 211-218) that perform operations on documents containing text elements (such as documents 240-260). Back-end system 130 may maintain a database 135 that associates one or more text elements in the front-end system's documents, such as "JOHN SMITH 112", with objects and/or functions. In this embodiment, front-end system 110 may determine whether there is an association between the text elements and any data objects by using link program 230, such in a Dynamic Link Library file, that is stored on the front-end system and that may maintain lists to store or buffer the text content. Such a link program may be a software program that supports context links. If front-end system 110 determines that there is an association between the text element and a data object, because the text element was found once in the back-end system, the front-end system may create a context link for that text element. For example, if a search by back-end system 130 of its associated database reveals that a certain text element in a document is of the type customer name, front-end system 110 may then create a context link that allows a user to access a data object for that customer by selecting that text element in the document. After a text element or sequence of text elements have been associated with a text element or object type, a user will be able to choose from a menu of related actions (i.e., functions) by selecting that text element.

Figure 10:
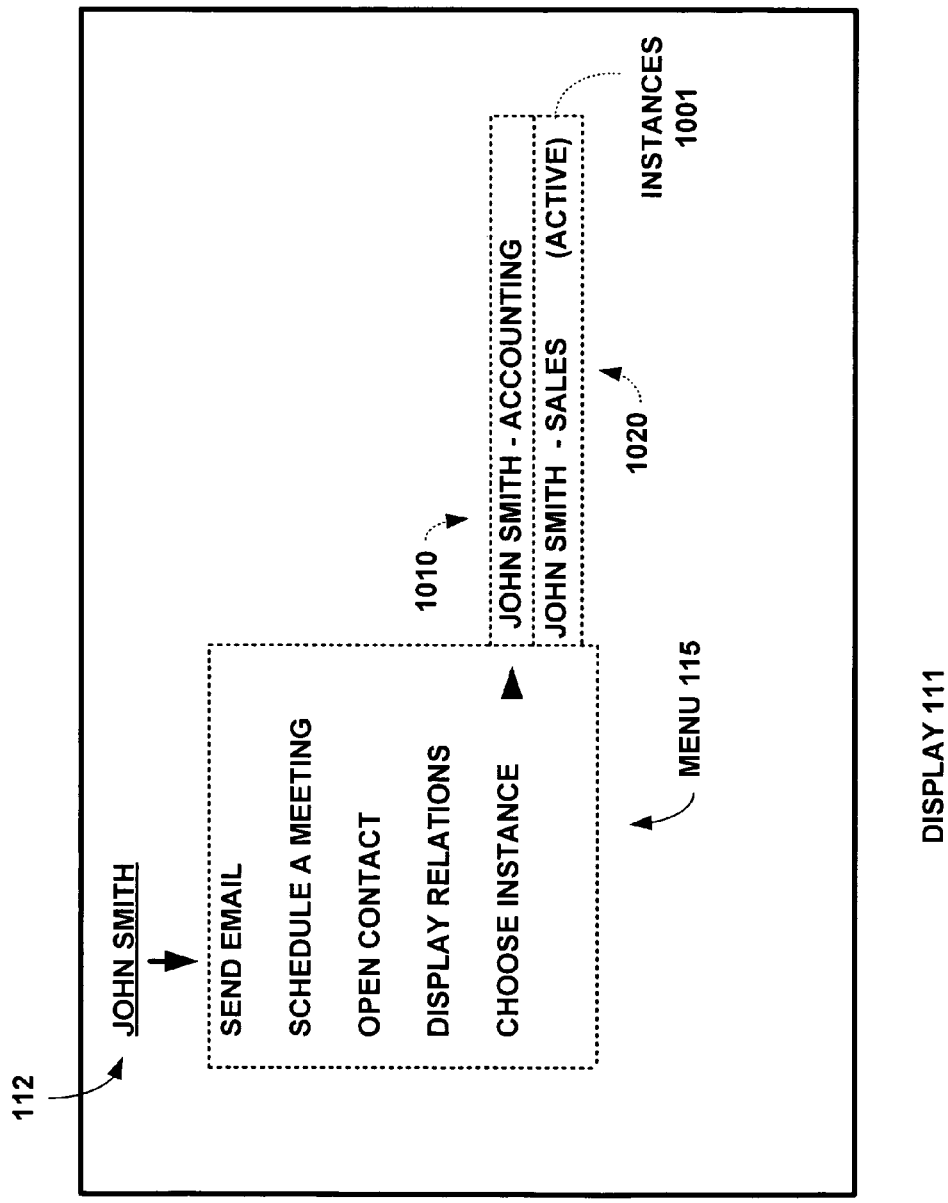
FIG. 10 is a simplified block diagram of a screen that shows a text element which is associated, by a context link, with more than one data object of a particular data object type according to an embodiment of the present invention.

Text elements may be associated with one or more types of context links, such as a customer context link and an employee context link, and context link type may correspond to a type of business object. In an embodiment, a business object/context link type may have relationships with other business objects/context link types, and such relationships may be displayed to the user as a separate structure such as, for example, a tree. Thus, a business partner type of object may be related to an invoice or a quotation type of object. In some embodiments, and as shown in FIG. 10, for a particular type of data object (such as "employee"), a text element may be associated with multiple instances of that data object. In such embodiments, for example, where there are two employees named "John Smith," the user may be able to select among the two different instances of "John Smith" when activating a context link. In some embodiments, the number of valid hits that may be presented for a data object may be customized. In some embodiments, the data stored for a context link may be enriched to allow for the visualization of more than one hit, such as by recording employee address data, employee ID, or department name, in addition to the employee's name.

FIG. 10 is a simplified block diagram of a screen that shows a text element that is associated, by a context link, with more than one data object of a particular data object type according to an embodiment of the present invention. FIG. 10 shows display 111, text element 112 ("John Smith") and menu 115 of FIG. 1. As discussed with reference to FIG. 1, activation (i.e., opening) of the context link for the text element "John Smith" results in the display of menu 115. In the example shown in FIG. 10, however, one of the optional actions displayed as part of menu 115 is the option to choose an instance among the possible data objects "John Smith" for this particular data object type. For example, assume that there are two employees named "John Smith" in the organization, one in the accounting department and one in the sales department. When the person operating on the document selects the context link for "John Smith" (such as by double-clicking on the phrase "John Smith" in the document), menu 115 will be displayed that includes an option to "Choose Instance." In this embodiment, this option is displayed if there is more than one data object (here, "John Smith—Accounting" and "John Smith—Sales") of a data object type (here, the data object type "employee") associated with the text element 112 (here, "John Smith").

As shown in FIG. 10, the user may be presented with a list of data object instances 1001 from which to choose. In this example, "John Smith in Sales" is shown to be the "active" instance. If the user selects one of the actions listed (such as "Send Email", "Schedule a Meeting", etc.), the action will be performed on the active instance (i.e., an email will be sent to "John Smith—Sales"). If the user chooses a different instance, then the chosen instance becomes the active instance. In some embodiments, once an instance is chosen, it becomes the default active instance for any other activations of the context link for that text element.

In the embodiment shown in FIG. 10, the application program (such as 211-218 of FIG. 2) that is operating on a document (e.g., 240 of FIG. 2) may receive a request to open a context link to a text element (e.g., "John Smith" 112 of FIG. 10 or document 241 of FIG. 2) that is part of that document. The application program may be determine (e.g., from a contact link list) whether more than one data object of a data object type (e.g., data object type "employee") is associated with the text element. An add-in context link processing module, which may be called from the application program, may make this determination. If more than one data object of a data object type is associated with the text element, a list of data objects of that data object type that are associated with the text element (1010) and information to distinguish the listed data objects from each other (1020) may be displayed. The user may then make a selection of a data object from the displayed list, such as by selecting "John Smith—Accounting". It may be recorded that the selected data object, which would then be the active data object, is a default active data object for future selections to that text element. After the instance selection is processed, the user may make a selection from a list of actions, such as by selecting "Send Email," in which case an email would be sent to "John Smith—Accounting" in the example discussed.

At some point after a document is opened by an application program, the application program may determine that the user has entered an additional text element into the application program document, and that the additional text element is associated with more than one data object of a data object type. For example, the user may have just typed in "John Smith," and the context link module may indicate that two "John Smith" data objects were found of the employee data object type. If so, a context link may be created at front-end system 110 from the additional text element to each of the associated data objects. An entry may be created in a table of context links that records information distinguishing the data objects of that data object type, such as the department name of each employee "John Smith," the employee's address data, employee ID, etc. As discussed above, in some embodiments all context links are supported by a single dynamic link library file.

In order to obtain any information regarding associations between text elements and objects/functions, front-end system 110 may send the text element to back-end system 130, which may initiate a query for the text element. Based on the results that are returned from back-end system 130, front-end system 110 may store a record, for example using a Dynamic Link Library, of any associations between the text element and the functions that may be executed for that text element. Such a record may contain the results of the query, and may include the number of times the text element is found for each context link type and a data object identifier. In an embodiment, a single Dynamic Link Library is used to access and support any context links associating data objects with text elements in any application program documents on the front-end system, regardless of the type of text element (e.g., customer name, employee name, phone number, etc.), type of functions, or type of documents (e.g., word processor formatted document, spread sheet, etc.). Such an access may be, for example, initiating a function on the data object or displaying data that is related to the data object. In an embodiment, one Dynamic Link Library is used to support all data object types regardless of whether the data objects are currently known to the front-end system or are later declared in the back-end system. In an embodiment, front-end system 110 buffers records of associations (context links) for those front-end system program text elements that have functions on back-end system 130.

In an embodiment, a single link program on front-end system 110, such as link program 230, may be used to handle all context link related communications with back-end system 130. The configuration information for the dynamic links may be created with each initialization of the link program, as discussed below with reference to FIG. 3. In an embodiment, back-end system 130 contains business logic, such as actions which can be executed for a specific context link (e.g., the action "create order" for a text element of the type customer). Thus, back-end system 130 may contain any software that is used to execute a function on a business object. In an embodiment, front-end system 110 does not contain any business logic, and the recognition function as well as the computing that supports actions taken on the object may be performed by back-end system 130.

Figure 3:
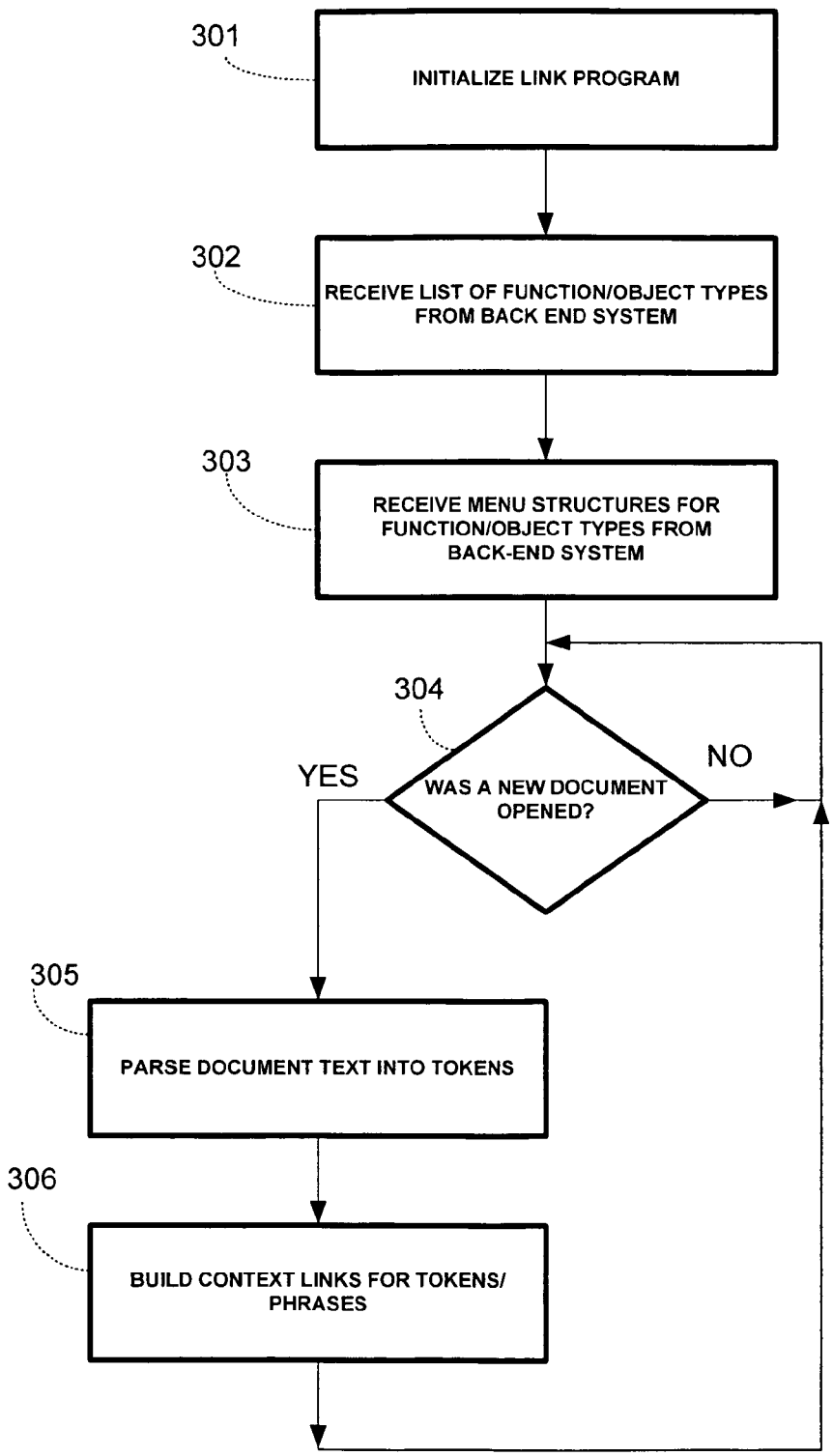
FIG. 3 is a flow diagram that illustrates a method for creating context links in a front-end system between application program text elements and objects/functions according to an embodiment of the present invention.

FIG. 3 is a flow diagram that illustrates a method for creating context links in a front-end system between application program text elements and objects/functions according to an embodiment of the present invention. This method may be performed, for example, after the front-end system is rebooted. The first time that the front-end system initiates an application program, the front-end system may initialize a link program (301), which causes a request to be sent to the back-end system for a list of object/function types that are stored on the back-end system (302). In addition to object/function types, according to one embodiment back-end system 130 may also return to the front-end system a menu structure (303), that later may be populated with information from documents stored on the front-end system, based on a parameter conversion. In an embodiment, the menu structure is received only if textual information to be displayed with the menu is not available at that time. After an application program on front-end system 110 opens a new document (304), that application program may parse the document text into tokens (305), which may be for example words in a word-processing document. Front-end system 110 may then build context links for the document (306), for example as discussed with reference to FIG. 4-6 below. If new text is later added to a document, such as when a user types in a new word into a word processor document, a search as discussed below may be performed for the new word to determine if a context link should be created.

Figure 4:
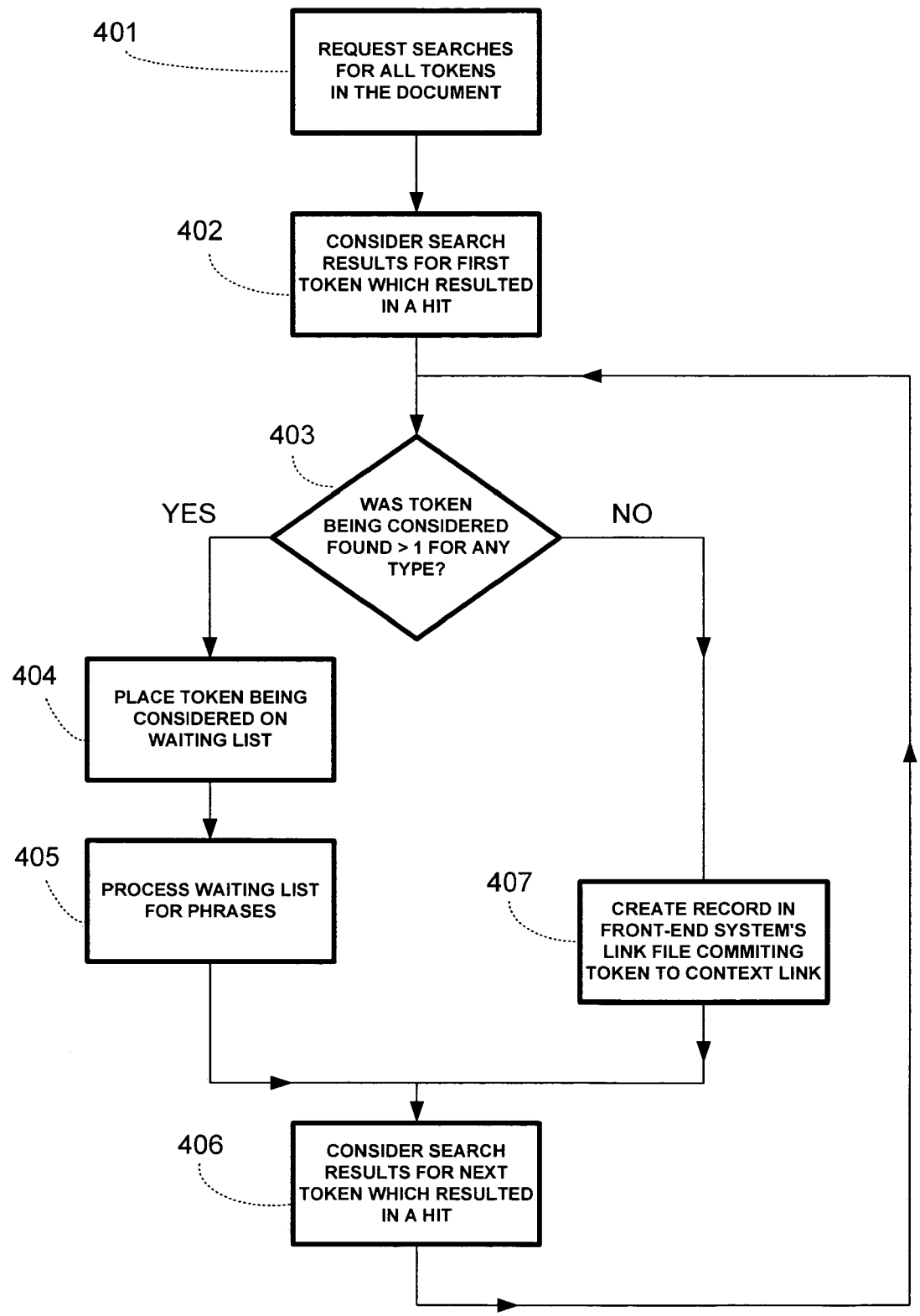
FIG. 4 is a flow diagram that illustrates a method of building context links according to an embodiment of the present invention.
Figure 5:
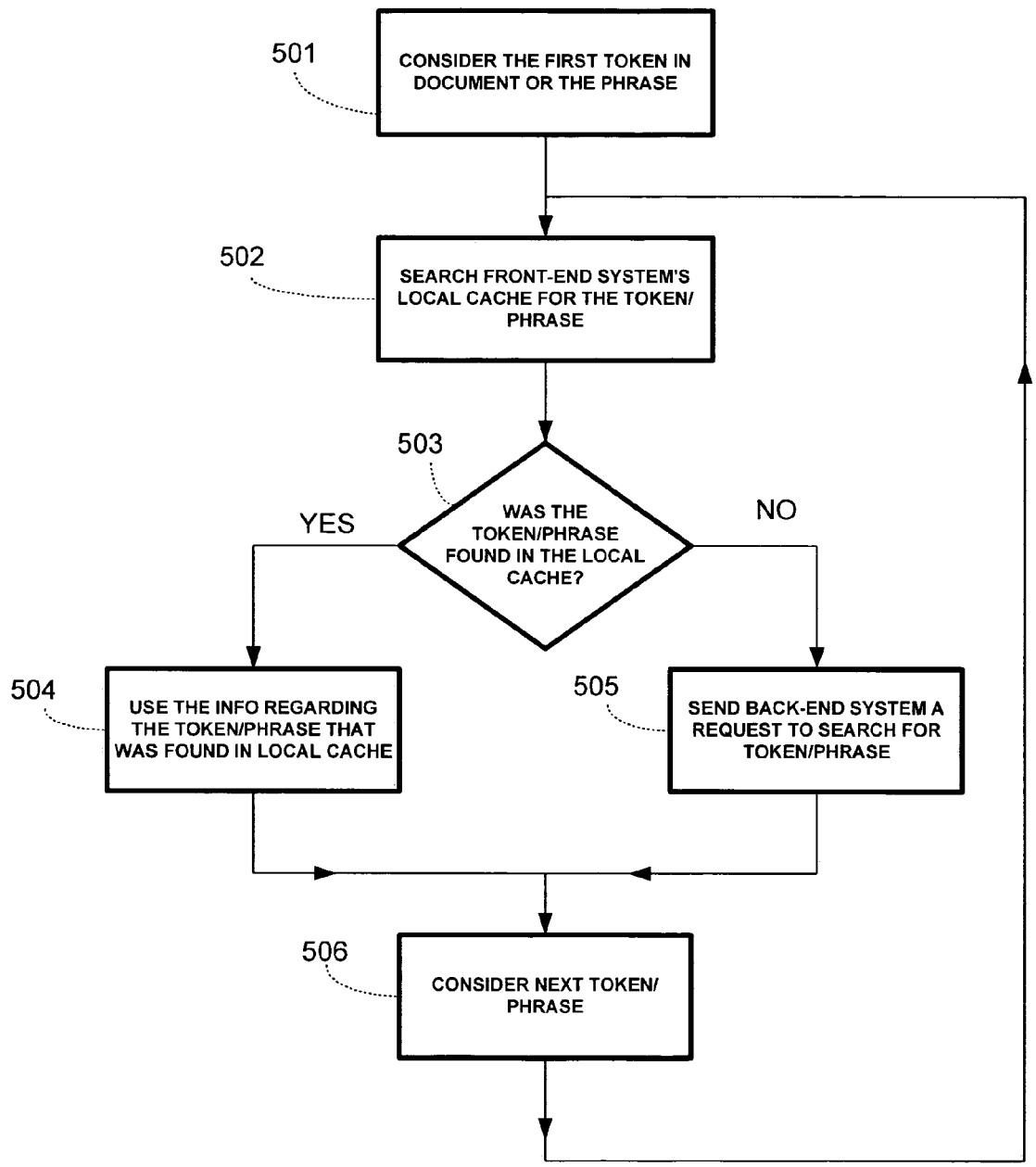
FIG. 5 is a flow diagram that illustrates a method of searching for tokens or phrases according to an embodiment of the present invention.

FIG. 4 is a flow diagram that illustrates a method of building context links according to an embodiment of the present invention. In an embodiment, the front-end system 110 may request searches for all tokens in the document (401), for example as shown in FIG. 5. Front-end system 110 may store information on the result of the searches in a buffer for later analysis, as discussed below, for each token that was found in one or more of the back-end searches. Each time a token is found, the results of the search may specify the type of function with which the text element is associated, and the buffer may contain different lists or queues for each type of function. Front-end system 110 may then consider the search results for the first token in the document which resulted in a hit (i.e., the token was found) (402). If a token is found exactly once by back-end system 130 for a particular token type, then a context link entry may be created in a file for that text element (407). If a token/text element results in a one hit for two or more types, two context links may be created for that token/text element. In such a case, a menu of functions for each of the object types may be displayed as cascading menus. For example, if "John Smith" is a customer and an employee, a customer context link and an employee context link may be created and displayed as cascading menus for the text element "John Smith." The search results for the next token may then be considered (406), and this process may be repeated. If the token being considered was found more than once for any token type (403), then in an embodiment that token is placed on a waiting list for that type (404) and the waiting list is processed for phrases as discussed below in FIG. 6. The search results for the next token may then be considered (406), and this process may be repeated for each token in the document. In some embodiments, as shown in FIG. 10, there may be two data objects of a particular data object type for a single text element.

For example, the token "Dave" may be found by the back-end system one hundred times as a "customer" name and fifty times as an "employee" name. In an embodiment, the method discussed above may continue by combining into phrases any tokens that appear consecutively in the document and that each result in more than one hit for a type in the back-end system searches. In this embodiment, a token may result as two hits in a back-end system search if the token is found once in the back-end system as a single word and a second time as part of a phrase that includes that word. In an alternative embodiment, a context link may be created for a phrase if one of the works in the phrase results in a unique hit. As discussed below with reference to FIG. 6, the front-end system may request a search for each phrase and, based on the results received from the back-end system, the front-end system may store information for phrases that are found in one or more of these back-end searches. If a phrase is found more than once for a token type, the front-end system may use this phrase to create modified phrases and may repeat the process discussed above by requesting that the back-end system perform a search for these modified phrases. For example, if a word (e.g., "Dave") is found as employee type token with ten hits, and thus may stay in an employee-queue, and the next word in the document (e.g., "Smith") is also found as employee with fifty hits, then these two words may be then be combined and sent to the backend system to get a result for this combination of two words of one type. Continuing this example, if the phrase ("Dave Smith") is found more than once, and the next word (e.g., "Jr.") is also found as an employee type, a search may be requested for the combined phrase ("Dave Smith, Jr.") as a employee. The queue mechanism for the combined tokens may be used for each supported context link type, such as customer, employee or reseller, with a different queue or list for each supported type.

FIG. 5 is a flow diagram that illustrates a method of searching for tokens or phrases according to an embodiment of the present invention. The method shown in FIG. 5 may be used to search for a token or for a phrase (i.e., a combination of tokens). In this embodiment, the front-end system 110 has a memory that stores (or caches) the results of searches for tokens or phrases. According to the method shown, the first token in the document or the first phrase is considered (501) and a search is made for that token or phrase in the front-end system's local cache (502). If the token or phrase was found in the local cache (503), in which case a search for this token or phrase was done before and that search resulted in a hit, then the information regarding that token or phrase is used (504). If the token or phrase was not found in the local cache (503), then the front-end system sends the back-end system a request for the token or phrase (505). The back-end system may perform such a search on a set of data that is cached in a memory and thus minimize access to databases on the back-end system. The next token or phrase is then considered (506).

Figure 11:
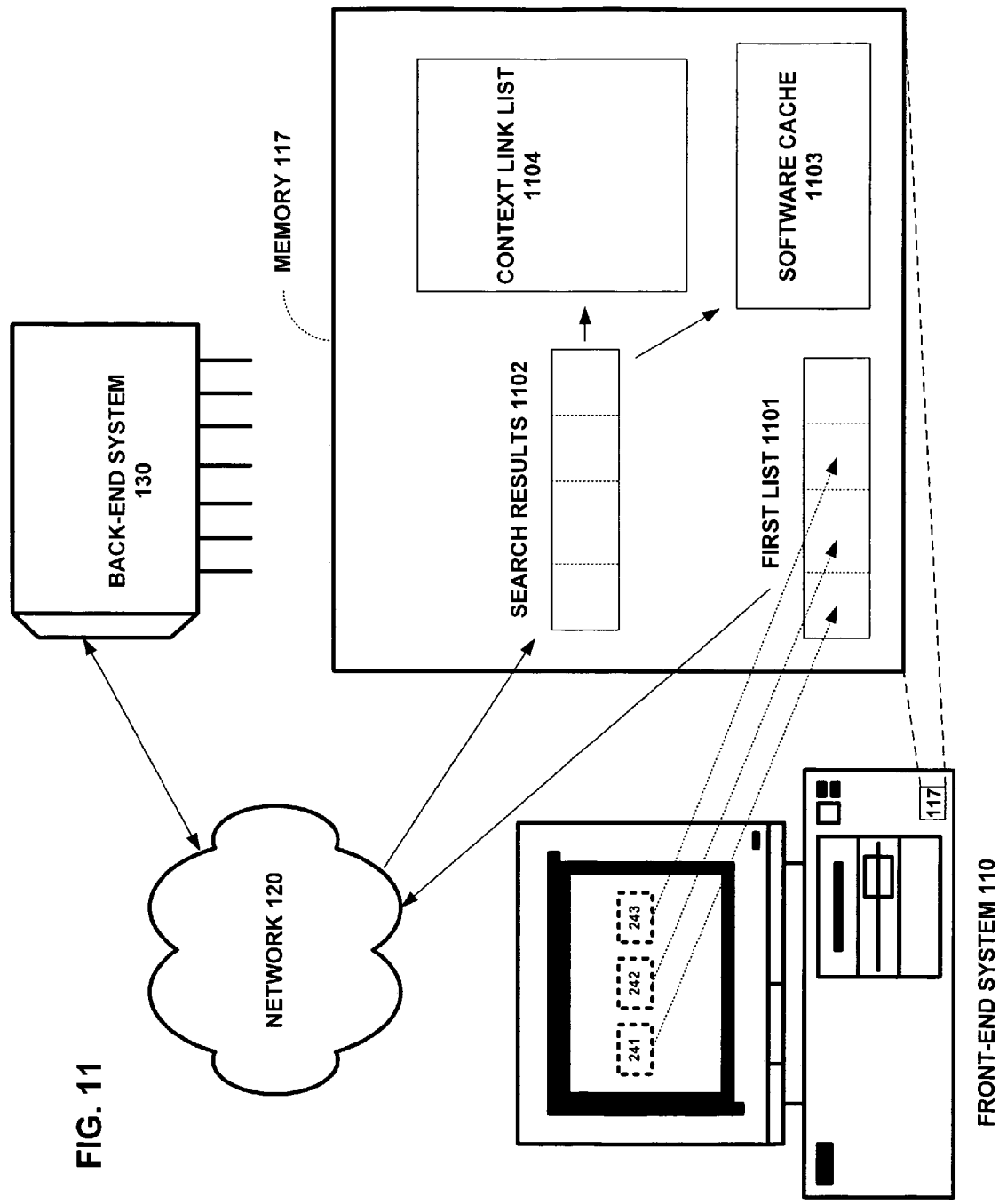
FIG. 11 is a simplified block diagram that shows the transmission of a list of text elements from a front-end system to a back-end system for a determination of whether the text elements are associated with data objects according to an embodiment of the present invention.

In another embodiment, shown in FIG. 11, a list of text elements is transmitted from a front-end system (client) to the back-end system for a determination of whether the text elements are associated with data objects. In such a bulk recognition mode, the front-end may pass a list of words or text elements, instead each single text element, to a backend bulk recognition function. In an embodiment, a single recognition list is transmitted once per each row of the document. The result of the search of data objects may be delivered back to the front-end system as a bulk search result, and these results may be harmonized with the cache on the front-end system. Such an embodiment may reduce the overhead from the front-end system to the back-end system. For example, the time for a search for a token may be 500 milliseconds, and 80% of that time may be the time for transferring the search and results back and forth between the front-end system and back-end system. An additional optimization may be to send bulk-queries directly to a fast the search engine in the back-end system (such as the SAP TREX® search engine).

FIG. 11 shows front-end system 110, memory 117, network 120, and back-end system 130 of FIGS. 1-2. In FIG. 11, front-end system 110 is displaying a document (such as document 140 of FIG. 2) that includes text elements 241-243. As shown in FIG. 11, memory 117 stores a first list 1101, search results 1102, a software cache 1103, and a context link list 1104. According to a bulk-recognition embodiment, a new document may be parsed into tokens, which represent text elements, such as text elements 241-243. An iteration may be made through a list of tokens for a certain range of the document, and entries may be made on first list 1101 containing tokens that represent these text elements. Thus, list 1101 has an entry for text element 241, an entry for text element 242, and an entry for text element 243. As discussed below, first list 1101 will be transmitted to back-end system 120 to perform a bulk recognition of the text elements represented on first list 1101. As user herein, a "list" is any type of data structure that contains multiple items, and thus first list 1101 and the other lists discussed herein may be realized using any type of data structure as appropriate. In an embodiment, each entry in first list 1101 represents a text element. An entry represents a text element if it contains the text or some information that identifies the text. In some embodiments, first list 1101 is culled so that it does not contain more than one entry that represents an instance of any particular text element. For example, it is not necessary for the text element "John" to appear twice on first list 1101 because it is only necessary to perform the recognition once for this text element.

In some embodiments, before sending first list 1101 to back-end system 130, a search of software cache 1103 is made to determine if any of the text elements in first list 1101 appear on software cache 1103. In embodiments, the presence of a text element in software cache 1103 indicates that a recognition has already been attempted for that text element, and locally stored results of that recognition may be used instead of transmitting the text element to back-end system 130.

If a text element is not found in the cache, or if a check of the cache is not made, back-end system 130 may be called to attempt to match the text element against the relevant stored data objects. In the embodiment shown, a list of multiple tokens/text elements is transmitted from front-end system 110 through network 120 to back-end system 130. In some embodiments of such a bulk mode, the complete token list may be compressed before it is transmitted. Back-end system 130 may then determine if the text elements represented on first list 1101 are associated with data objects maintained by back-end system 130 and may transmit to front-end system 110 search results 1102, which may contain (for example in a list) an indication of whether the text elements represented on first list 1101 were determined to be associated with a data object, as well as a data object type. In this embodiment, search results 1102 contains the combined results for all the tokens on first list 1101.

In embodiments, based on the results received as search results 1102, entries may be created in context link list 1104 for each of the text elements that were determined to be associated with a data object, and each such entry may indicate that a text element is associated with at least one data object as a context link. Context link list 1104 may be used later to process a request to activate a context link, such as discussed with reference to FIG. 10. In an embodiment, at least one entry in the context link list associates a text element with more than one data object in the second computer, as shown in FIG. 10. This process may be repeated until representatives of all the text elements in the document have been transmitted to the second computer.

In addition, the results shown as search results 1102 may be stored in the software cache 1103. In other words, based on the results 1102, an entry may be created in software cache 1103 to indicate whether a text element (such as "John Smith") is associated with a data object. Thus, entries may be added to the software cache for the text elements represented on first list 1101, for example when first list 1101 is transmitted to back-end system 130 or when search results 1102 are received from back-end system 130. In an embodiment, each text element represented in software cache 1103 was previously transmitted to the back-end system 130 for determining if the text element is associated with a data object. As discussed above, software cache 1103 may be later used, in the context of determining if a context link should be created for a text element, to determine locally if that text element is associated with a data object that is maintained by back-end system 130. As used herein, software cache 1103 is referred to as a "software cache" because it is a data structure stored in a general memory of front-end system 110 that operates as a logical cache.

As part of the process of adding entries to software cache 1103, the size of the software cache may be compared against a threshold size (such as a number of entries or size in units of memory), and if the cache size is greater than this threshold amount, a predefined number of entries may be removed from the software cache 1103. Removing entries from software cache 1103 may comprise removing a plurality of entries for least recently used text elements from the list, removing entries from the software cache that have been in the software cache for more than a threshold amount of time (e.g., one hour), etc. A contingent of the cache (e.g., 30-40%) may be discarded by least-recently-used criteria. In some embodiments, all entries of the cache are looped through and a sorted list is built up based on the specified value, which then is the base for the discard-operation. In some embodiments, software cache 1103 stores an access counter for entries in the cache, stores a timestamp for entries in the cache, stores a measurement of the average memory usage of entries, and/or stores execution time of the query that was used in creating each entry, and one or more of these criteria may be used for extrusion purposes.

Figure 12:
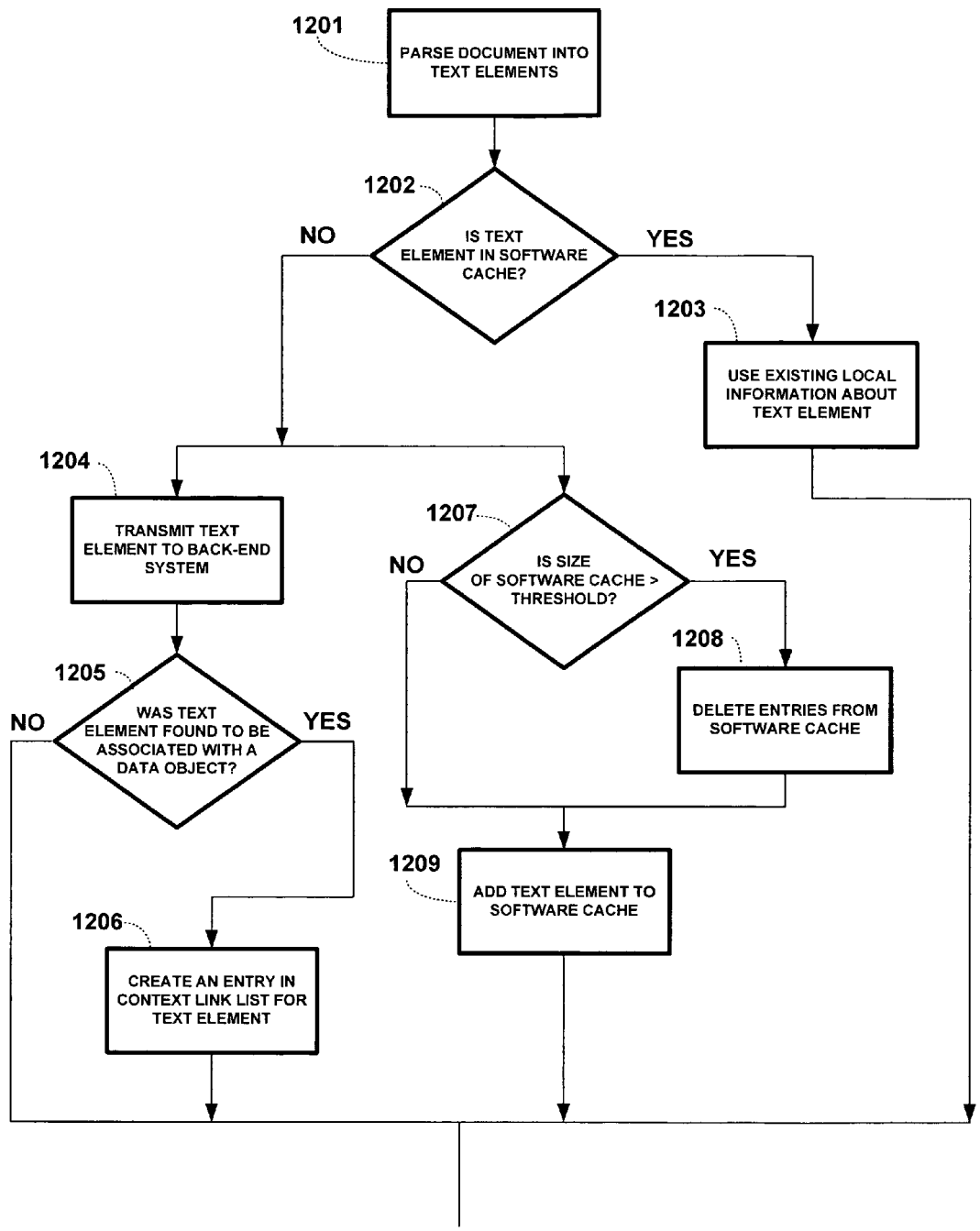
FIG. 12 is a simplified flow diagram that shows a method of determining whether text elements are associated with data objects using an optimized software cache according to an embodiment of the present invention.

FIG. 12 is a simplified flow diagram that shows a method of determining whether text elements are associated with data objects using an optimized software cache according to an embodiment of the present invention. This method may be performed, for example, with the system shown in FIG. 11. A document may be parsed into text elements (1201), as discussed above with regard to text elements 241-243. A determination then is to be made whether the text elements are associated with data objects in the back-end system. To do so, a determination may first be made whether the text element is stored in a local software cache (1202), such as software cache 1103. If so, then existing locally stored information about the text element may be used (1203) to determine if there is an association with a data object and, if so, to create a context link. If not, then the text element may be transmitted to the back-end system (1204), either as a single text element or as part of a list of text elements. The back-end system may then send back results, such as search results 1102, and based on those results it may be determined (1205) if the text element was found to be associated with a data object. If so, an entry may be created for that text element in a context link list, such as context link list 1104. In addition, if the text element is not found in the software cache (1202), then that text element may be added to the software cache and, if necessary, entries may be extruded from the software cache. In an embodiment, a determination may be made if the size of the software cache is greater than a threshold (1207), and if so entries may be deleted from the software cache. Before, during or after determining if text elements are to be extruded, the text element being transmitted to back-end system may be stored in the software cache. In some embodiments, the software cache entry may be updated to include results of the determination as to whether the text element was found to be associated with a data object (1205).

Figure 6:
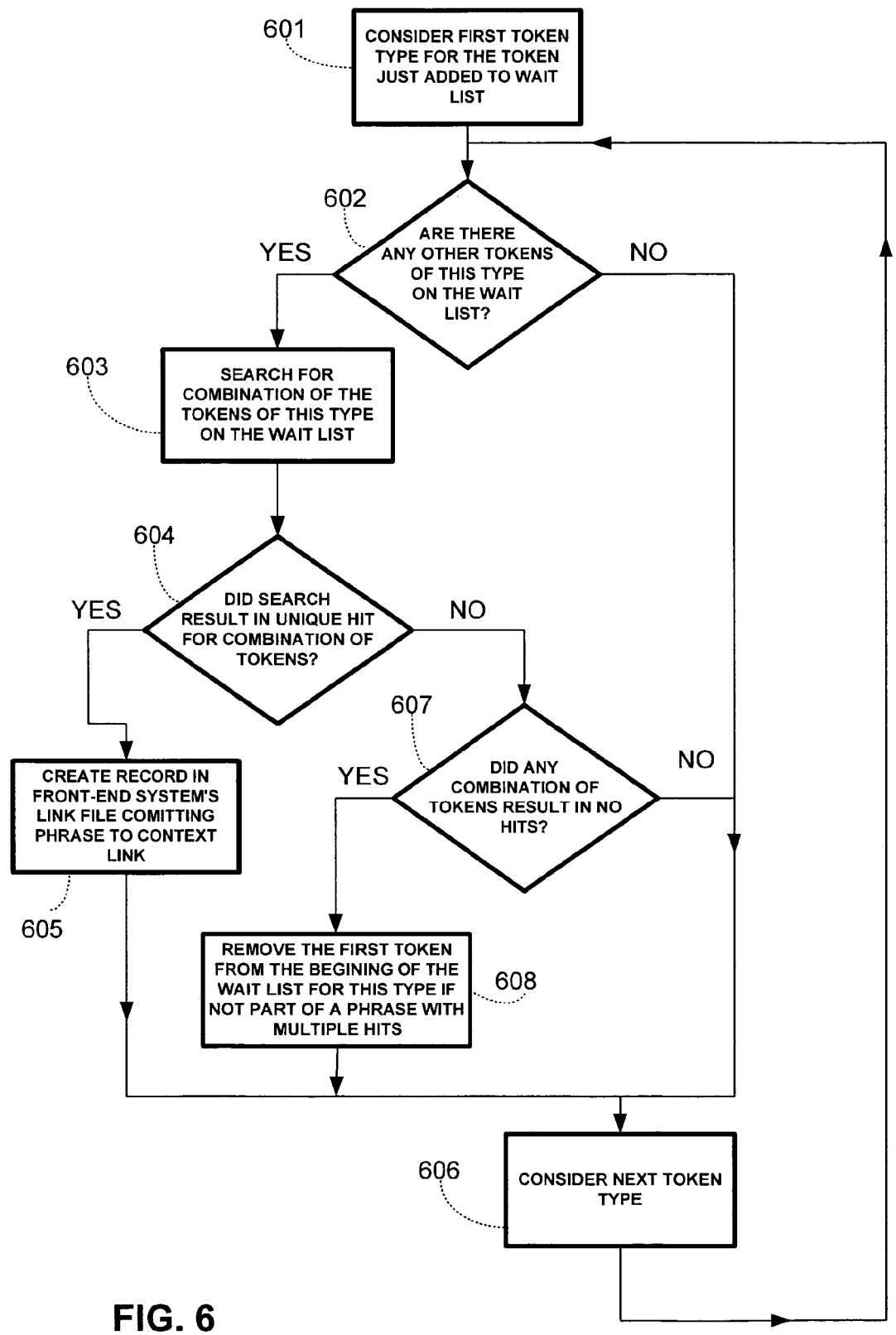
FIG. 6 is a flow diagram that illustrates a method of processing tokens to determine if a phrase is found according to an embodiment of the present invention.

FIG. 6 is a flow diagram that illustrates a method of processing tokens to determine if a phrase is found according to an embodiment of the present invention. This method is performed for waiting lists which contain tokens that have resulted in more than one hit for a particular token type. There may be one waiting list maintained for each token type. The tokens may be placed on the waiting list in the order as they are found in the document being processed and may be removed from the waiting list if it is determined that the token is not part of a phrase for which a context link is to be created. The method shown in FIG. 6 may be performed after a token was just added to the waiting list, and this token may result in a hit for a single type or multiple types. As discussed above with reference to FIG. 4, if a token was added to the waiting list, the token resulted in multiple hits for at least one type. According to the method shown, a first token type for the token just added to the waiting list is considered (601). If there are no other tokens of this type in the waiting list (602), the next token type is considered (606). If there are other tokens in the waiting list of this token type (602), a search is made for a combination of tokens of this type in the waiting list (603). This search may be performed according to the method shown in FIG. 5. Searches may be performed for multiple possible combinations starting with the last token on the waiting list and adding prior tokens on the waiting list. For example, a search may be made for all the tokens on the waiting list for this type, all the tokens on the waiting list for this type except for the first token, all the tokens on the waiting list for this type except for the first and second token, etc. If a search for a phrase resulted in a unique hit for a combination of tokens (604), a record may be created in the front-end system's link file committing the phrase to a context link (605). If a search for a phrase did not result in a unique hit for a combination of tokens (604), and the search for that phrase resulted in no hits (607), the first token in this phrase is removed from the beginning of the wait list for this type (608), because that token was not part of a phrase with multiple hits. The next token type is then considered (606). In some embodiments, rather than send phrases individually to the back-end system, such phrases (and the results of the phase searches) may be transmitted from the front-end system to the back-end system in bulk mode.

In an embodiment, each user is assigned an authorization level that provides for access to each type of business object that is maintained by the back-end system. For example, a particular user may be in the human resources department and, thus, may not have authorization to read, modify, or create a customer type business object. In a further embodiment, the method of searching in the back-end system database for a token limits searches based on the authorization level of the user. For example, if a set of context links is being created for a particular user who does not have certain authorizations for an object or set of objects, then the system may not search the back-end system for such objects.

In an embodiment, a function associated with a text element in a document may require one or more parameters. For example, where the text element is an employee name type of object, after a user selects (e.g., clicks on) that name, the front-end system may display a menu of functions/actions for that context link, which may include sending an email to the employee. The parameter for these functions may be different from, although based upon, the text element associated with the context link. In the example above, the employee name may be "John Smith," and the parameter "JohnSmith@ourcompany.com" may be passed to the back-end system along with the function "send an email". In an embodiment, such parameters are not binded against a specific object at runtime in that is not known in advance what object will be identified as a context link. In an embodiment, during an initiation process the front-end system will retrieve configuration data about menus and other related items from the backend system, such as supported context link types and the menu and actions related to these types.

In an embodiment, a general interface is used to send a request for configuration data from the front-end system to the back-end system in that the same backend-method is always called to retrieve the initialization data/configuration data. When a new document is opened, the document may be parsed for tokens and context links may be identified and recorded as discussed above. In an embodiment, the tokens, phrases and their hits are stored in the buffer at the front-end system until the last application program is closed or the system is shut down. In a further embodiment, a context link cache is kept in memory at the front-end system so long as an application is open for which context link supports is being provided, and the context link information itself may be stored in the document. Thus, even if a document is closed and then opened again, the document will not have to be parsed a second time for context links. In this case, when a document is opened a second time, the user will see each previously recognized context links.

If a user selects (e.g., clicks on) text having a context link, which will active a menu that is displayed for this context link, the front-end system may determine if there are parameters to convert as menu text or menu-action (e.g., a "url") for any of the menu items that are to be display. If there are any parameters to be converted, than the back-end system may be called to lookup the parameter (or a synonym attribute) for the recognized object. For example, in the configuration data, a menu text may be "Send an email to &FirstName& &LastName& . . . " and a menu action may be "mailto:&EmailAddress&". If the text "John Smith" is recognized as an employee-object (which supports context links) then the text in the menu may appear at runtime as "Send an email to John Smith" and the Action "Url" may appear as mailto: John.Smith@ourcompany.com.

In an embodiment, the front-end system also provides attachment services such that a document may be stored on the back-end system and a logical relationship may be created between that document and the data object. For example, a letter that was written to a customer using a word processor may be attached to a context link in another document format, such that when a user of the other document selects that context link, the letter will be opened in the word processor so that the user can operate the word processor on that letter.

Figure 7:
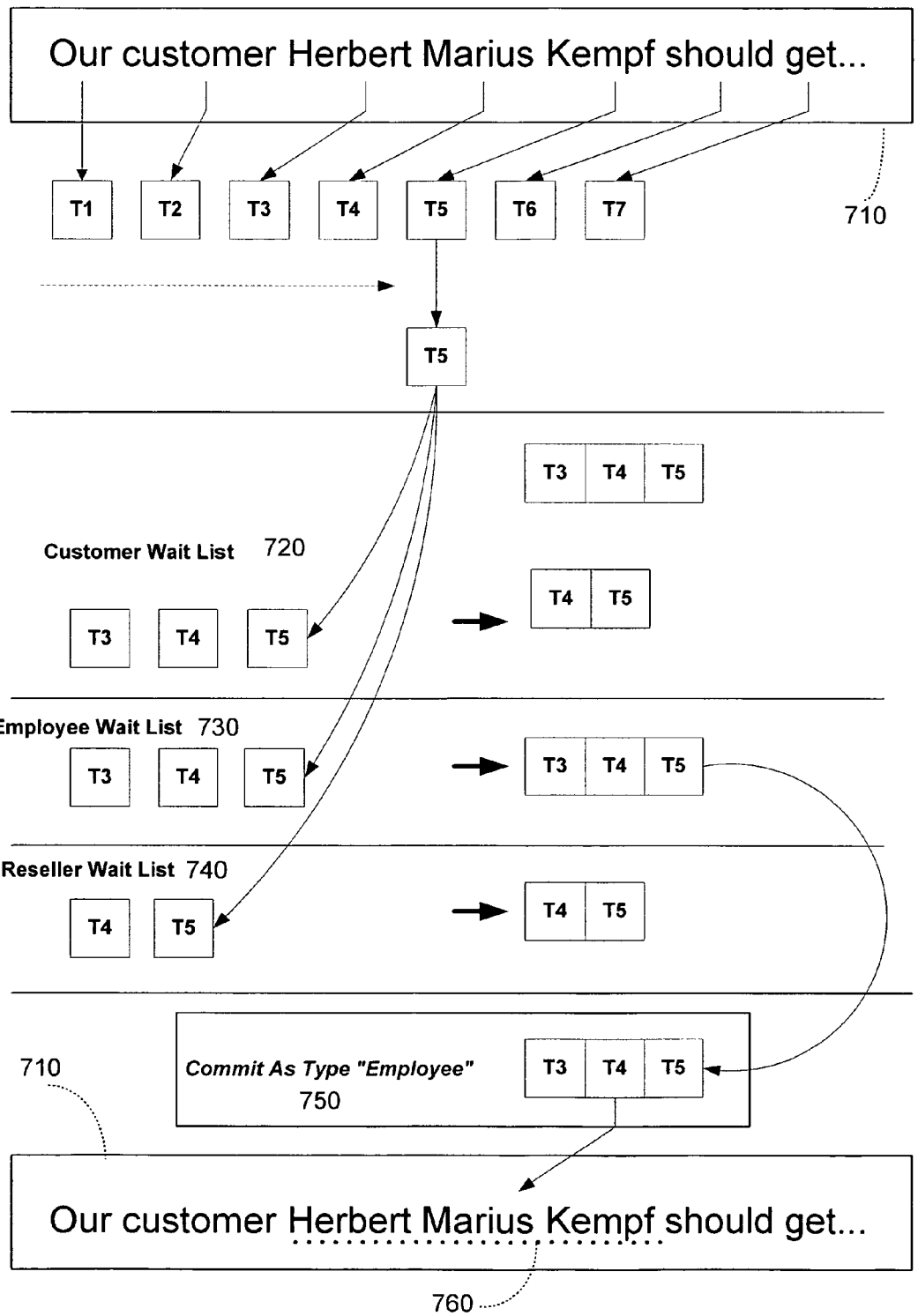
FIG. 7 is a simplified block diagram that shows an example of building phrases for a context link according to an embodiment of the present invention.

FIG. 7 is a simplified block diagram that illustrates an example of building phrases for a context link according to an embodiment of the present invention. FIG. 7 shows a string of text 710 from a document that is being operated on by an application program, such as a work processor. FIG. 7 also shows three token waiting lists, Customer List 720, Employee List 730, and Reseller List 740. Each of these waiting lists corresponds to a different type of data object. These waitlists may be used to keep track of tokens that are being considered as a part of a phrase. FIG. 7 also shows a committed phrase 750 and the text 710 as it has been highlighted at a later time to show that presence of a context link to a phrase.

As shown in FIG. 7, the string of text 710 may be parsed into text elements or tokens T1 to T7, each of which may represent an individual word. The method of building phrases may iterate through the tokens starting from left to right, as when reading an English language document. In the example shown in FIG. 5, the front-end system may be currently be considering whether the token T5 (here, the word "Kempf") is part of a phrase as found on the back-end system. The front-end system may have previously placed the tokens T3 and T4 on the customer wait list 720, T3 and T4 on the employee wait list 730, and T4 on the reseller wait list 740 because these tokens resulted in more than one hit for these data object types. After adding the token T5 to each of these wait lists, the front-end system will send the back-end system a request to search for the phrase T3/T4/T5 for the customer data object type, T3/T4/T5 for the employee data object type, and T4/T5 for the reseller data object type. In this example, if the phrase T3/T4/T5 is found more than once for the customer data object type, then the token T5 will be left on the list and the next token T6 will be processed. Similarly, if the phrase T4/T5 is found more than once for the reseller data object type, then the token T5 will be left on the list and the next token T6 will be processed. If as shown in this example the phrase T3/T4/T5 is found only once for the employee data object type, then the phrase T3/T4/T5 will be committed as a context link as a committed phase 750, and this context link will be highlighted (for example, by underlining) as context link 760 in text 710. Thus, in this example, the phrase "Herbert Marious Kempf" will have been found only once as an employee type data object in the back end system, and a context link is created from the text element "Herbert Marious Kempf" is created to that data object.

Figure 8:
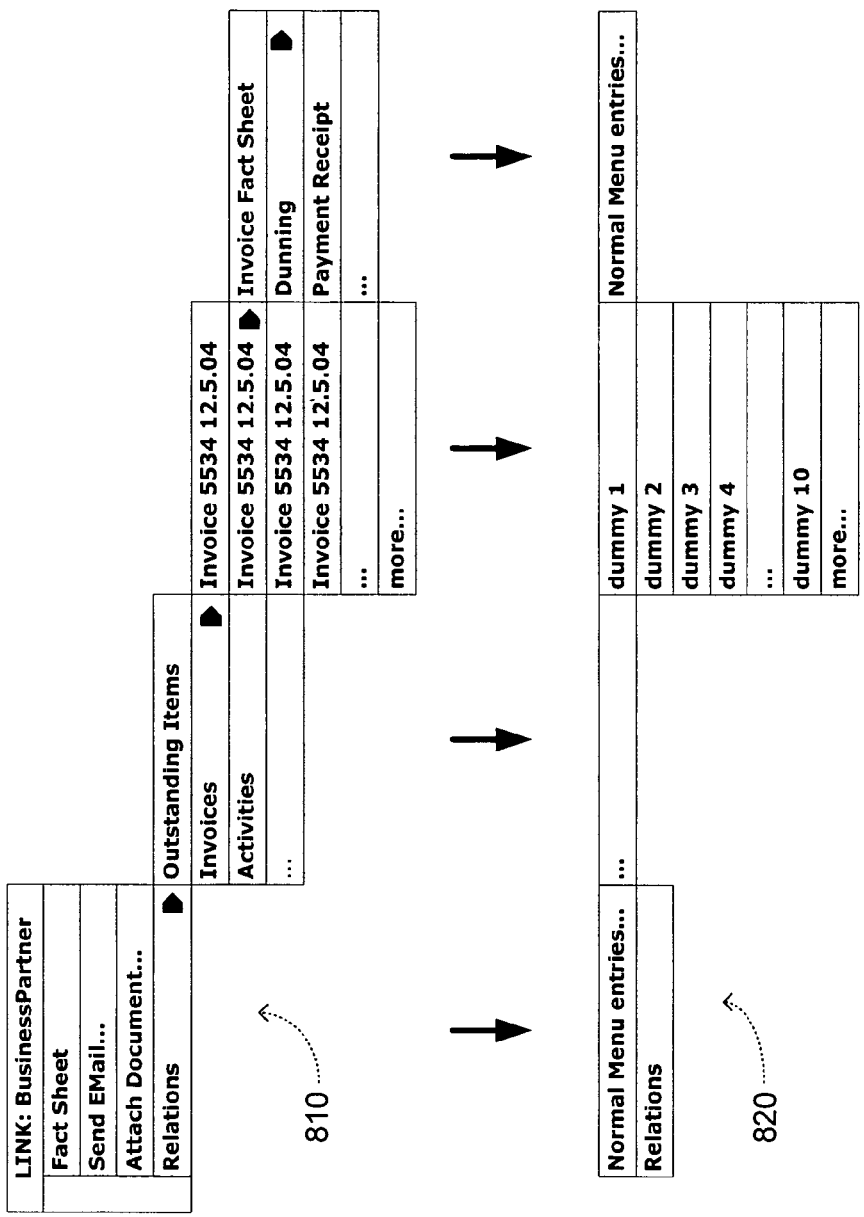
FIG. 8 is a simplified block diagram that illustrates an example of a menu tree displaying the relationship between a text element and data objects in a back-end system according to an embodiment of the present invention.

FIG. 8 is a simplified block diagram that illustrates an example of a menu tree displaying the relationship between a text element and data objects in a back-end system according to an embodiment of the present invention. FIG. 8 shows a menu tree 810 for a business partner data object, as may be viewed by a user of the front-end system, as well as a menu structure that may be used to create a menu tree. The user of the front end system may access the business partner data object by selecting a context link to a textual element displayed by an application program executing on the front-end system. In addition to functions that may be associated with this business partner data object (e.g., send email), FIG. 8 also shows relations between the business partner data object and other data objects, in this case outstanding items, invoices, and activities. FIG. 8 also shows the identity of a number of invoices that are associated with this data object, and for one of the invoices shows a number of data objects that are associated with that invoice (here, "invoice fact sheet", "dunning", and "payment receipt".)

In an embodiment, the front-end system may construct the menu 810 as follows. First, the front-end system may add a menu entry "relations" in addition to the normal menu entries for each data object type. Next, the front-end system may retrieve a dynamic list of linkable data object types. For each type, a list may be generated. Next, the front-end system may generate a fixed list of dummy item menus, as shown in structure 820. When the appropriate context link is activated, the back-end attachment service may be called for relations. Finally, the front-end system may repaste the menu entries and actions for the specific data object type for each dummy entry.

Figure 9:
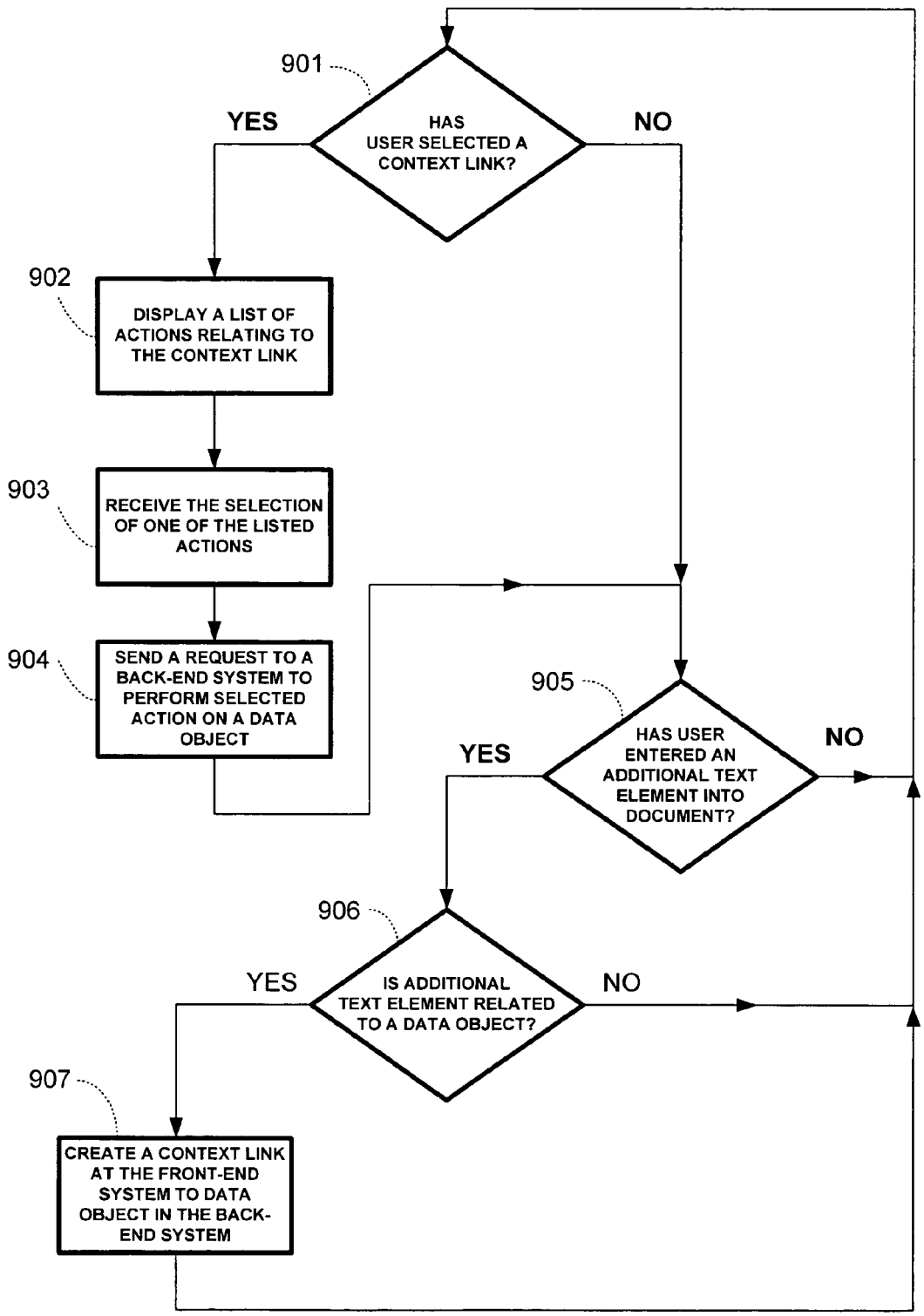
FIG. 9 is a flow diagram that illustrates a method of processing context links for a previously opened document according to an embodiment of the present invention.

FIG. 9 is a flow diagram that illustrates a method of processing context links for a previously opened document according to an embodiment of the present invention. This method may be performed on a document being operated on by an application program on the front-end system and for which context links were previously created, for example using a method discussed above. As shown in FIG. 9, it may be determined whether the application program received an indication that a user has selected a context link to a text element in the document (901). In an embodiment, the context link may be selected by selecting the text element. In response to the selection of the context link, the application program, with the support of the link program, may display a list of actions relating to the context link (902). The actions may include displaying data relations or performing functions on a related data element. The application program may then receive the selection of one of the listed actions (903) and in response to this a request may be sent to a back-end system to perform that selected action on a data object that is related to the selected text element (904). As further shown in FIG. 9, whether or not a context link was selected, the application program may determine if the user has entered an additional text element into the application program document (905). If an additional text element was entered, and that additional text element is related to a data object in the back-end system (906), then a context link may be created at the front-end system to a data object in the back-end system (907). In an embodiment, determining whether the additional text element is related to a data object in the back-end system may be performed as discussed above.

The above is a detailed discussion of the certain embodiments. It may be understood that the examples discussed are for illustration purposes only and are not intended to limit the configuration to that shown. For example, the order of the steps discussed may be varied as appropriate without departing from the scope of the invention. It is of course intended that the scope of the claims may cover other embodiments than those described above and their equivalents.

What is claimed is:

1. A method comprising:
   creating a context link associated with a text element of a document at an application program executing on a computer system;
   storing the context link in a memory associated with the application program;
   receiving a request to open the context link;
   identifying a set of data objects associated with the text element
   displaying a list including a subset of the identified data objects that are associated with the text element and a user authorization level;
   displaying information to distinguish listed data objects;
   receiving a selection of a data object from the displayed list;
   identifying the selected data object as the default data object for future selections of the context link;
   storing an association between the selected data object and the document in a back-end computer system;
   displaying a list of actions associated with the selected data object; and
   receiving a selection from the list of actions associated with the selected data object.

2. The method of claim 1, wherein the method further comprises recording that the selected data object is a default data object for future requests to open a context link to that text element.

3. The method of claim 1, wherein the method further comprises:
   determining that an additional text element has been entered into the document;
   determining that the additional text element is associated with more than one data object of a data object type; and
   creating a context link from the additional text element to each of the associated data objects.

4. The method of claim 3, wherein said creating a context link comprises creating an entry for the text element in a list, wherein said entry records information to distinguish a data object associated with the text element from other data objects that are associated with the text element.

5. The method of claim 1, wherein all context links are supported by a single dynamic link library file.

6. A method comprising:
   parsing a new document being operated on by an application program at a first computer into text elements;
   storing an entry on a first list for each of a plurality of the text elements, wherein each entry represents a text element;
   transmitting the first list from the first computer to a second computer to determine in the second computer if the text elements represented on the first list are associated with data objects in the second computer;
   receiving an indication at the first computer from the second computer whether text elements represented on the first list were determined to be associated with a data object;
   creating an entry in a context link list at the first computer for each of the text elements that were determined to be associated with a data object, wherein entries on the context link list indicate that a text element is associated with at least one data object as a context link;
   receiving at the application program a request to open a context link to a text element;
   determining whether more than one data object of a data object type is associated with the text element and, if so, performing the following:
      displaying a list of data objects of the data object type that are associated with the text element and a user authorization level;
      displaying information to distinguish the listed data objects from each other;
   receiving a selection of a data object from the displayed list;
      identifying the selected data object as the default data object for future selections of the context link;
      receiving a selection of an action relating to a context link for the selected data object for one of the listed actions; and transmitting a request from the first computer to the second computer to perform an action on the selected data object.

7. The method of claim 6, wherein the method further comprises determining if a representative of all the text elements in the document has been transmitted to the second computer and, if not, repeating said transmitting, receiving and creating until representatives of all the text elements in the document have been transmitted to the second computer.

8. The method of claim 6, wherein the first list that is transmitted does not contain more than one entry that represents an instance of any particular text element.

9. The method of claim 6, wherein at least one entry in the context link list associates a text element with more than one data object.

10. The method of claim 6, wherein said storing an entry on a first list for each of the plurality of text elements comprises:
   determining for each of the plurality of text elements whether the text elements are represented in a software cache, wherein each text element that is represented in the software cache was previously transmitted to the second computer for determining if the text element is associated with a data object; and
   storing a text element on the first list of text elements only if that text element was not found to be represented in the software cache.

11. The method of claim 10, wherein said transmitting the first list further comprises adding entries to the software cache for the text elements represented on the first list.

12. The method of claim 11, wherein said transmitting the first list further comprises determining whether the size of the software cache is greater than a threshold amount and, if so, removing entries from the software cache.

13. The method of claim 12, wherein removing entries from the software cache further comprises removing a plurality of entries for least recently used text elements from the software cache.

14. The method of claim 13, wherein removing entries from the software cache further comprises removing entries from the software cache that have been in the software cache for more than a threshold amount of time.

15. A method comprising:
   parsing a new document being operated on by an application program at a first computer into text elements;
   determining if a text element is represented in a software cache, wherein the text elements represented in the software cache were previously transmitted to a second computer for determining if those text elements are associated with a data object;
   if the text element is not represented in the software cache, performing the following:
      transmitting a representative of the text element from the first computer to the second computer to determine in the second computer if the text element is associated with one or more data objects;
      determining whether the size of software cache is greater than a threshold amount and, if so, removing entries from the software cache;
      adding the representative of the text element to the software cache; and
      receiving a response at the first computer from the second computer that indicates whether the transmitted text element was determined to be associated with a data object and, if so, creating an entry in a context link list at the first computer to indicate that the text element is associated with at least one data object as a context link;
   receiving a request to open a context link to a selected text element;
   determining whether more than one data object of a data object type corresponds to the selected text element and, if so, performing the following:
      displaying a list of data objects of the data object type that are associated with the selected text element and a user authorization level;
      displaying information to distinguish listed data objects;
      receiving a selection of a data object from the displayed list;
      identifying the selected data object as the default data object for future selections of the context link;
      receiving a selection of an action relating to a context link for the selected data object; and
      transmitting a request from the first computer to a second computer to perform the selected action on the selected data object.

16. The method of claim 15, wherein removing entries from the software cache comprises removing a plurality of entries for least recently used text elements from software cache.

17. The method of claim 15, wherein removing entries from the software cache further comprises removing entries from the software cache that have been in the software cache for more than a threshold amount of time.

18. The method of claim 15, wherein said transmitting a representative of the text element from the first computer to the second computer comprises transmitting a list representing that text element and a plurality of other text elements to the second computer to determine in the second computer if the text elements are associated with data objects.

* * * * *

UNITED STATES PATENT AND TRADEMARK OFFICE
CERTIFICATE OF CORRECTION

PATENT NO.        : 7,665,083 B2                                          Page 1 of 1
APPLICATION NO.   : 11/111931
DATED             : February 16, 2010
INVENTOR(S)       : Demant et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1335 days.

Signed and Sealed this

Seventh Day of December, 2010

David J. Kappos
*Director of the United States Patent and Trademark Office*